United States Patent [19]
McGrath et al.

[11] Patent Number: 5,362,838
[45] Date of Patent: Nov. 8, 1994

[54] CARBONATE POLYMERS CONTAINING ETHENYL ARYL MOIETIES

[75] Inventors: James E. McGrath, Blacksburg, Va.; Stephen E. Bales, Midland, Mich.; Daniel M. Knauss, Blacksburg, Va.; Thomas A. Chamberlin; Michael J. Mullins, both of Midland, Mich.; Maurice J. Marks, Lake Jackson, Tex.

[73] Assignees: Virginia Polytechnic Institute and State University, Blacksburg, Va.; The Dow Chemical Company, Midland, Mich.

[21] Appl. No.: 19,950

[22] Filed: Feb. 19, 1993

[51] Int. Cl.$^5$ .............................. C08G 64/00
[52] U.S. Cl. .................... 528/198; 528/171; 528/174; 528/202; 528/203
[58] Field of Search ............... 528/198, 202, 203, 204, 528/171, 174

[56] References Cited

U.S. PATENT DOCUMENTS

| | | | |
|---|---|---|---|
| 4,230,548 | 10/1980 | Adelmann et al. | 528/196 |
| 5,156,656 | 10/1992 | Parker et al. | 55/16 |
| 5,171,824 | 12/1992 | Marks et al. | 528/198 |

FOREIGN PATENT DOCUMENTS

| | | |
|---|---|---|
| 63-15821 | 1/1988 | Japan . |
| 0633023 | 1/1988 | Japan . |
| WO9211309 | 7/1992 | WIPO . |

*Primary Examiner*—John Kight, III
*Assistant Examiner*—Terressa M. Mosley

[57] ABSTRACT

There are disclosed carbonate polymers having ethenyl aryl moieties. Such carbonate polymers are prepared from one or more multi-hydric compounds and have an average degree of polymerization of at least about 1 based on multi-hydric compound. These polymers, including blends thereof, can be easily processed and shaped into various forms and structures according to the known techniques. During or subsequent to the processing, the polymers can be crosslinked, by exposure to heat or radiation, for example, to provide crosslinked polymer compositions. These compositions have a good combination of properties, including for example, processability into shaped articles having unexpectedly good combinations of toughness, solvent resistance, ignition resistance, modulus and resistance to thermal linear expansion.

17 Claims, No Drawings

CARBONATE POLYMERS CONTAINING ETHENYL ARYL MOIETIES

This invention relates to novel carbonate polymers containing ethenyl aryl moieties. These polymeric compositions are well suited for preparing a wide range of shaped or molded articles such as by direct use in preparing such articles or by use in composite or blend materials which can be subsequently used to prepare such articles. Examples of the shaped or molded articles include injection or compression molded articles and extruded articles such as sheet or film. During preliminary processing steps, during the preparation of articles, or after articles have been prepared, the ethenyl aryl groups are readily activated by thermal or other means to react or polymerize and result in crosslinking or branching of the carbonate polymer, depending upon the concentration and location of the ethenyl aryl groups.

BACKGROUND OF THE INVENTION

There have been many efforts to provide improved combinations of processability and physical properties in carbonate polymers and other engineering thermoplastic resins. For example, in U.S. Pat. Nos. 5,171,824 and 4,708,994 and copending application No. 894,033 it is taught to incorporate reactive arylcyclobutene groups. Such resins are then crosslinked and cured during a subsequent heating step and shown to be more solvent and heat resistant.

In published Japanese Patent Applications 63-003,023 (1988) and 63-015,821 (1988) it is disclosed that carbonate polymers can be provided with isopropenyl end groups by the use of isopropenyl phenol as a carbonate polymer chain terminating agent. The disclosed polymers are taught to be used as reaction-type resin modifiers, additives or raw materials for the manufacture of copolymers.

In U.S. Pat. No. 4,912,914 it is proposed that crosslinked or branched polycarbonates can be prepared by incorporating a diester diphenolic monomer into the carbonate polymer backbone, then heat activating the crosslinking reaction. However, since the crosslinking reaction causes the polymer backbone to be cut at the point of crosslinking, the polymers that are taught would be expected to have undesirable levels of low molecular weight and high molecular weight (gel) byproducts.

In U.S. Pat. Nos. 3,770,697 and 3,652,715 carbonate polymers are provided with thermally activated, unsaturated imido groups to prepare functionalized, curable polymers. Upon heat activation, the resulting addition polymerization provides a crosslinked, high molecular weight component. Unfortunately, however, it is difficult to incorporate such unsaturated imido-functional groups in carbonate polymers in standard, interfacial carbonate polymer production processes due to the nitrogen-containing imido groups that must be incorporated and, upon attempting to process and cure such polymers, it is found that they are thermally unstable.

U.S. Pat. No. 4,943,619 discloses a polycarbonate-epoxy copolymer which is formed by reacting the epoxide groups of an epoxy resin with in-chain carbonate groups of a carbonate polymer in the presence of a catalyst. Through the reaction of diepoxides and polycarbonates, three dimensional crosslinked networks can be formed. However, since the crosslinking reaction causes the polymer backbone to be cut at the point of crosslinking, the polymers that are taught would be expected to have undesirable levels of low molecular weight and high molecular weight (gel) byproducts.

In addition, there are a number of known crosslinked carbonate polymer compositions of a curable or thermoset nature based on epoxide, acrylic and other types crosslinking techniques. See for example U.S. Pat. Nos. 5,037,903; 4,255,243 and 5,047261; and Japanese Patent Publications JP 63-270,641; JP 01-024,809; JP-01-075,521 and JP 01-054,058.

However, due to deficiencies such as poor reactivity of the curable resin, thermal instability during and after curing, and insufficient hardness, chemical resistance, adhesion and/or optical properties, carbonate polymers having improved combinations of these properties are continually being sought.

SUMMARY OF THE INVENTION

Therefore, in one aspect the invention is a carbonate polymer which can be cured to produce a carbonate polymer possessing good combinations of properties, including hardness, toughness, optical properties, adhesion, solvent resistance, chemical resistance, heat resistance, and thermal stability. In one embodiment the present invention is a carbonate polymer having ethenyl aryl moieties. In another embodiment of the invention, ethenyl aryl moieties of these carbonate polymers, through thermal or other activation means, are reacted or polymerized and produce crosslinking or branching in the carbonate polymer, depending upon the number and location of the ethenyl aryl moieties in the carbonate polymer. Other embodiments of the invention include ethenyl aryl-containing carbonate polymers having an average degree of polymerization of from about 1 to about 100; and carbonate polymers having polymerized therein from about 0.01 to about 2 mole of ethenyl aryl-containing compound per mole of multi-hydric compound of the carbonate polymer.

In another aspect the present invention is a carbonate polymer as described above having terminal ethenyl aryl moieties. Preferably, such polymer has essentially complete ethenyl aryl compound chain termination, more preferably having an average of at least 2 terminal ethenyl aryl moieties per carbonate polymer molecule. A further aspect of the present invention is a carbonate polymer having terminal ethenyl aryl moieties and having less than complete ethenyl aryl compound chain termination. Preferably, where such a polymer has less than complete ethenyl aryl compound chain termination, an ethenyl aryl chain terminating compound and additional chain terminating agent(s) are employed in the preparation of the polymer. In this aspect, preferably at least 0.01 mole of an ethenyl aryl chain terminating compound is employed per mole of additional chain terminating agent(s).

In another aspect, the present invention is a condensation carbonate polymerization process comprising the steps of (a.) supplying to a reaction vessel a reaction mixture comprising (i) a multi-hydric compound; (ii) a carbonate polymer precursor; and (iii) from about 0.01 to about 1 mole of condensation reactive compound which contains or is able to be functionalized to form reactive ethenyl aryl moieties per mole of multi-hydric compound; (i), (ii) or (iii) being supplied independently or in combinations of two or more; (b.) maintaining the reaction mixture under carbonate polymerization conditions; and (c.) recovering from the reaction mixture a carbonate polymer having reactive ethenyl aryl moieties or moieties which are able to be functionalized to form reactive ethenyl aryl moieties. In a further embodiment, the present invention is also a process as set forth above further comprising the step of subjecting the carbonate polymer product having reactive ethenyl aryl moieties to conditions under which the reactive ethenyl aryl moieties react to crosslink or branch the polymer.

It has been found that the curable, crosslinkable or branchable carbonate polymers according to above embodiments of the present invention can be handled and melt processed according to the techniques generally utilized with carbonate polymer resins and, when subjected to sufficient conditions, result in articles having improved combinations of physical properties. It is understood that within the broad range of ethenyl aryl-containing carbonate polymers according to the present invention, depending upon the molecular weight of the carbonate polymer and the number and location of the ethenyl aryl moieties present in an average polymer chain, different properties of the crosslinked or branched carbonate polymers according to the present invention can be optimized and improved. Carbonate polymers having two or more terminal ethenyl aryl moieties per chain and a low degree of polymerization in the precrosslinked phase are as easily processed as low molecular weight thermosettable resins while providing molded or shaped articles having good mechanical properties and chemical resistance which are similar to or better than high molecular weight linear thermoplastic carbonate polymers in many respects. Carbonate polymers according to the present invention having less than two ethenyl aryl units per chain and molecular weights in the range of the commercially available engineering thermoplastic polycarbonates can be cured to provide branched carbonate polymers with improved melt processability.

DETAILED DESCRIPTION OF THE INVENTION

Carbonate polymers are well known in the literature and can be prepared by well known techniques, In general, the carbonate polymers can be prepared from one or more multi-hydric compounds by reacting the multi-hydric compound(s) such as a dihydric phenol with a carbonate precursor such as phosgene, a haloformate or a carbonate ester such as diphenyl carbonate. The carbonate polymers can be prepared from these raw materials by an appropriate process selected from one of the known polymerization processes such as the known interfacial, solution or melt processes. Such carbonate polymers generally possess recurring structural units as shown in formula I:

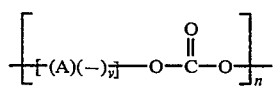

I n is the degree of polymerization; A is a radical having at least 2 valences which is a remnant of a multi-hydric compound, (—) represents valences of A connecting to a carbonate moiety as shown and v is the number of valences of A in excess of 1, an integer greater than or equal to 1. In general A is predominantly a dihydric compound remnant (v is 1) but, if branched polymers are intended, A can include amounts of a tri- or tetra-hydric compound remnant at low levels (v is greater than 1). Dihydric phenols are preferred multi-hydric compounds. The use of a dihydric phenol results in a primarily linear, aromatic carbonate polymer, the most typical of the carbonate polymers. The carbonate polymer molecules are usually terminated with the remnant of a monohydric compound or other monofunctional chain terminating compound.

Such carbonate polymers can be generally represented according to formula II:

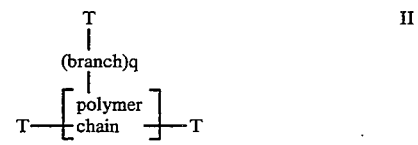

II where T is independently the chain terminating remnant of a monohydric compound or other monofunctional chain terminating compound with or without an ethenyl aryl moiety and q is the average number of polymer chain branches per polymer molecule, preferably from 0 to 0.05. In cases where branched polymer is specifically desired, q is preferably from 0.01 to 0.05.

In the aromatic carbonate polymers of the types which are currently commercially available and most often employed in thermoplastic molding applications, n is usually from about 30 to 315, representing aromatic polycarbonates with weight average molecular weights of from 20,000 to 200,000. See for example, "Polycarbonates", Encyclopedia of Polymer Science and Technology, Vol. 11, p. 648 (1987). However, according to the present invention, where carbonate polymers are prepared with ethenyl aryl moieties and prior to crosslinking, n is at least about 1, and can advantageously be from about 2 to about 100. This represents, for example, aromatic carbonate polymer molecular weights (uncrosslinked) of at least about 200, preferably from about 500 to about 65,000.

In general, the pre-curing degree of polymerization for a particular carbonate polymer resin according to the present invention depends on the average number of ethenyl aryl moieties to be incorporated per polymer molecule, the desired processability of the uncured product and the property balance desired in the final, cured product. Carbonate polymers having two or more ethenyl aryl moieties per chain usually become highly crosslinked to drastically increase the effective molecular weight and provide the balance of physical properties usually associated with thermoset resins. Such polymers need only a low degree of polymerization in the precrosslinked phase. Branched carbonate polymers can be prepared from a carbonate polymer having less than two ethenyl aryl units per chain and a pre-curing average molecular weight within the ranges generally desired for branched carbonate polymers.

The dihydric phenols which are preferably employed as the multi-hydric compound to provide the aromatic carbonate polymers may contain one or more aromatic rings and contain as functional groups two or more hydroxyl moieties which are reactive with the carbonate precursor compound, each of which hydroxyl moiety is preferably attached directly to a carbon atom of an aromatic ring.

Typical dihydric phenols are 2,2-bis-(4-hydroxyphenyl)-propane ("Bisphenol A"); 9,9-bis(4-hydroxy)fluorene; hydroquinone; resorcinol; 2,2-bis-(4-hydroxyphenyl)-pentane; 2,4′-dihydroxy diphenyl methane; bis-(2-hydroxyphenyl) methane; bis-(4-hydroxyphenyl)-methane; bis(4-hydroxy-5-nitrophenyl)-methane; 1,1-bis-(4-hydroxyphenyl)-ethane; 3,3-bis-(4-hydroxyphenyl)-pentane; 2,2′-dihydroxydiphenyl; 2,6-dihydroxy naphthalene; bis-(4-hydroxyphenyl) sulfone; 2,4′dihydroxydiphenyl sulfone; 5′-chloro-2,4′ -dihydroxydiphenyl sulfone; bis-(4-hydroxyphenyl) diphenyl disulfone; 4,4′-dihydroxydiphenyl ether; 4,4′-dihydroxy-3,3′-dichloro diphenyl ether; and 4,4′-dihydroxy-2,5-diethoxydiphenyl ether. The preferred carbonate polymer is prepared using a dihydric phenol, preferably Bisphenol A, as the multi-hydric compound.

In addition to preparing carbonate homopolymers using a single multi-hydric compound in the process, it is, of course, possible in an alternative embodiment of this invention to employ two or more different multi-hydric compounds or a multi-hydric compound in combination with a glycol, a hydroxy terminated polyester, or a dibasic acid in the event a carbonate copolymer or polyester carbonate is desired. Most preferably the carbonate polymers according to the present invention, insofar as the multi-hydric compounds used, consist essentially of dihydric phenols which contain one or more aromatic rings and contain as functional groups two or more hydroxyl moieties which are attached directly to a carbon atom of an aromatic ring.

It is possible to employ a trihydric and/or tetrahydric phenol compound, as illustrated by the trihydric and/or tetrahydric phenols shown in U.S. Pat. No. 3,544,514, to prepare a randomly branched carbonate polymer which can be provided with terminal ethenyl aryl moieties. The randomly branched chain polycarbonates used in this invention are also well known to those skilled in the art and are prepared by reacting a dihydric compound with phosgene in the presence of a trihydric and/or tetrahydric compound as illustrated in U.S. Pat. No. 3,544,514.

When a carbonate ester is used as the carbonate precursor in the polymer forming reaction (transesterification process), the materials are reacted at temperatures of from 100° C. or higher for times varying from 1 to 15 hours. Under such conditions ester interchange occurs between the carbonate ester and the multi-hydric compound used. The ester interchange is advantageously done at reduced pressures of the order of from about 10 to about 100 millimeters (mm) of mercury.

According to the present invention, all or part of the carbonate polymer molecules prepared as described above are provided with ethenyl aryl moieties. In general an ethenyl aryl moiety or group corresponds to the formula III below:

wherein Ar is an aryl radical, such as phenyl or naphthyl, which may be substituted with an electron-withdrawing substituent or electron-donating substituent. Possible electron-withdrawing substituent or electron-donating substituents include, for example, alkyl radicals having from 1 to 10 carbons and halogens such as chlorine or bromine. The aryl radical is preferably a phenyl ring.

In one embodiment, the carbonate polymer molecules are provided with terminal ethenyl aryl moieties while random ethenyl aryl moieties which are pendant from the polymer backbone are avoided to the extent that their inconsistent concentration and distribution along the polymer molecules detrimentally affects the polymer properties, such as by causing gels or reduced physical properties. In this embodiment, the ethenyl aryl moieties in carbonate polymers according to the present invention preferably consist essentially of terminal ethenyl aryl moieties and more preferably there are essentially no pendant ethenyl aryl moieties measurable or otherwise detectable. In general an ethenyl aryl terminated carbonate polymer molecule corresponds to the formula IV below:

wherein B is a carbonate polymer, Ar is an aryl radical which may be substituted with an electron-withdrawing substituent or electron-donating substituent; and x is an integer of 1 or greater. For example, a styrene-terminated carbonate polymer molecule according to the present invention corresponds to the following formula V:

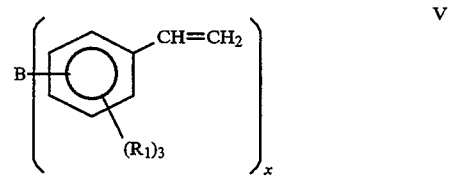

wherein B is a carbonate polymer, $R_1$ is independently in each occurrence hydrogen or an electron-withdrawing substituent or electron-donating substituent; x is an integer of 1 or greater.

Providing carbonate polymer molecules with ethenyl aryl moieties can be accomplished by a number of techniques including the use of a condensation reactive ethenyl aryl-functionalized compound in a carbonate polymer polymerization reaction and the use of a suitably functionalized ethenyl aryl compound to graft onto an existing carbonate polymer molecules or react with reactive moieties on an existing carbonate polymer.

In a preferred embodiment, ethenyl aryl-functionalized compounds having condensation polymer chain terminating activity are employed in a carbonate polymer polymerization process. Compounds suitable for use as chain terminating compounds in carbonate polymerization processes are well known in the literature. Similarly, ethenyl aryl-containing molecules suitable for use as chain terminating compounds in carbonate polymerization processes and techniques for preparing such molecules are well known in the literature. For example, ethenyl aryl-containing molecules with a single chloromethyl, acetoxy, acyl chloride or hydroxy functionality are all suitable, monofunctional condensation reactive compounds or, as in the case of acetoxy, can become condensation reactive in situ in a carbonate polymerization process. Acetoxy styrene, hydroxy styrene, and vinyl benzyl chloride are preferred hydroxyethenyl aryl compounds to react in the carbonate polymerization process to provide desired levels of terminal ethenyl aryl moiety.

By controlling the overall and relative amounts of the ethenyl aryl chain terminating compound and any other carbonate polymer terminating compounds employed, the concentration of the ethenyl aryl groups and the molecular weight of the carbonate polymer can be optimized for a particular set of properties. As is known, the total concentration of chain terminating compound(s) statistically determines the chain length of the carbonate polymer molecules. The amount of the ethenyl aryl chain terminating compound relative to the amount of any other chain terminating compound(s) will determine, on the average, what percentage of the carbonate polymer molecule ends will be terminated with an ethenyl aryl moiety and thus the amount of crosslinking and branching that will take place.

In cases where it is desired to have essentially complete ethenyl aryl chain termination in the carbonate polymers, it is clear that the use of any other chain terminating compounds is to be avoided. It is understood by those skilled in this art that essentially or substantially complete ethenyl aryl chain termination encompasses the fact that a carbonate polymer will have very minor amounts (on the order of one or two hundred parts per million or less) of terminal phenolic or hydroxyl groups present as an impurity due to nature of the carbonate polymerization process.

For linear carbonate polymers, complete ethenyl aryl chain termination means that the polymer molecule is terminated at both ends with the ethenyl aryl moiety and will provide a thoroughly crosslinked polymer composition upon activation of the crosslinking reaction. This situation for linear polymers is represented by formulas IV or V above wherein x is 2. Carbonate polymers having a relatively low degree of polymerization and complete chain termination with ethenyl aryl moieties are preferred in situations where a processable polymer is desired which has a very low initial melt viscosity prior to crosslinking but which can easily be heavily crosslinked to provide sufficient toughness, solvent resistance and heat resistance.

It should also be noted that branched carbonate polymers can be prepared by the use of branching compounds having three or more hydroxyl groups. This situation is represented by formula I above where, in a small portion of the monomeric remnants, v is 2 or 3. In these cases the relative concentrations of a chain-terminating ethenyl aryl compounds and any other chain-terminating compounds can be determined to provide the theoretical amount which would be required to provide the desired molecular weight and percentage of chain ends with a terminal ethenyl aryl moiety.

Carbonate polymers having a relatively low molecular weight prior to crosslinking and being substantially completely terminated with all ethenyl aryl terminal groups can be very desirably employed in applications where the molten polymer must flow quickly and easily into a mold, for example, relatively large, complicated molds. Then, upon further heating and crosslinking, in the mold or subsequently, the shaped articles possess good levels of toughness and other properties. It is very unexpected to be able to obtain a readily processable polymer which can be crosslinked to such a high degree and still provide shaped polymer articles which are relatively tough and heat and solvent resistant.

When it is desired to use an ethenyl aryl compound as the only monofunctional chain terminating species to terminate carbonate polymers in an interfacial polymerization process it has been found to be suitable to employ a mole ratio of at least about 0.01 mole ethenyl aryl compound per mole of the multi-hydric compound to obtain the desired carbonate polymer molecular weight. Preferably the mole ratio of the ethenyl aryl compound per mole of the multi-hydric compound is at least about 0.02, more preferably at least about 0.03 and most preferably at least about 0.1. With regard to the maximum levels, it has been found that the mole ratio of the ethenyl aryl compound per mole of the multi-hydric phenol compound is desirably less than or equal to about 2, more desirably less than or equal to about 1, preferably less than or equal to about 0.99, more preferably less than or equal to about 0.5.

For example, when preparing a carbonate polymer in an interfacial-type polymerization process using hydroxy styrene, a polycarbonate precursor compound such as phosgene and a dihydric phenolic compound such as bisphenol A, a molar ratio of 1 mole hydroxy styrene per mole of dihydric phenolic compound results in a degree of polymerization of about 2 determined prior to the crosslinking of the polymer. A molar ratio of 0.03 mole hydroxy styrene per mole of dihydric phenolic compound can be used to obtain a degree of polymerization of 34 when using these compounds to prepare a carbonate polymer which is substantially completely terminated with the ethenyl aryl moiety.

As mentioned above, one embodiment of the present invention includes polymers where less than all of the chain ends are terminated with the ethenyl aryl moiety. Since the ethenyl aryl moieties react upon activation, the resulting carbonate polymer will be branched around a connecting point of reacted ethenyl aryl moieties. It has been found that very desirable branched carbonate polymers can be provided by this partial crosslinking (i.e., branching) of the carbonate polymer via the ethenyl aryl polymerization reaction.

With regard to the preparation of aromatic carbonate polymers which are to be branched using the ethenyl aryl moiety and used in applications where the currently available branched resins are utilized, it is desired to obtain resulting branched resins where the molecular weight is in the range of from about 16,000 to about 65,000. Generally such branched polymers can be obtained by the use of chain terminating compound (ethenyl aryl and other) in total amounts in the range of from about 0.04 to about 0.01 mole per mole of multi-hydric aromatic compound. Within this range of chain terminating compound amounts, the desired amount of branching, typically an average of from 0.01 to 0.05 branches per polymer molecule, is then determined by the relative amounts of the ethenyl aryl and other type chain terminating compound which are employed.

For example, to obtain a noticeable effect from the branching it is desirable to use at least 0.01 mole ethenyl aryl chain terminating compound per mole of additional chain terminating agent, preferably at least 0.03 and more preferably at least 0.05 mole ethenyl aryl chain terminating compound per mole of additional chain terminating agent. In general, a minor amount of experimentation is employed to determine the amount of a particular ethenyl aryl chain terminating agent required to obtain desirable branched (but not completely crosslinked) carbonate polymers of a specified molecular weight. In general, the ethenyl aryl chain terminating compound can be used in amounts of up to about 0.9 moles ethenyl aryl chain terminating compound per mole of additional chain terminating agent, preferably up to about 0.8, more preferably up to about 0.6, more preferably up to about 0.5, more preferably up to about 0.3 and more preferably up to about 0.2 mole ethenyl aryl chain terminating compound per mole of additional chain terminating agent.

As mentioned above, it is also possible to incorporate the ethenyl aryl moieties into pendant locations along the carbonate polymer. Techniques for doing this would include the use of ethenyl aryl moiety-containing di-hydric compounds in a carbonate polymerization reaction or the subsequent ethenyl aryl functionalization of a previously prepared carbonate polymer.

The polymerization of the ethenyl aryl moiety can be initiated by subjecting the functionalized polymers to sufficient conditions, such as sufficient electron beam radiation or thermal conditions to activate reaction of the ethenyl aryl moiety. Sufficient conditions can be determined by those skilled in the art from this disclosure, such as temperatures of at least about 130° C., preferably at least about 150° C., more preferably at least about 180° C., more preferably at least about 200° C., more preferably at least about 220° C. and more preferably at least about 250° C. Means for initiating free radicals, such as free radical initiator compounds, are also desirably incorporated in the polymers to improve the rate and yield of the crosslinking or curing reaction. Suitable free radical initiator compounds include for example azo compounds such as azobisisobutyronitrile, organic peroxides such as dicumyl peroxide, di-t-butyl peroxide and benzoyl peroxide.

The novel carbonate polymers containing ethenyl aryl moieties are well suited for preparing a wide range of shaped or molded articles such as by direct use in preparing such articles or by use in composite, alloy or blend materials which can be subsequently used to prepare such articles. Examples of blends or alloys of these materials include mixtures with polycarbonates, polyesters, polyamides and other types of thermoplastic polymers. Examples of the shaped or molded articles include injection or compression molded articles and extruded articles such as sheet or film. In addition, other known types of additives can be included in the carbonate polymer of the present invention such as fillers (i.e., glass fibers), pigments, dyes, antioxidants, heat stabilizers, ultraviolet light absorbers, mold release agents, impact modifiers and other additives commonly employed in carbonate polymer compositions.

As can be seen in the experiments below, the ethenyl aryl moieties provide carbonate polymers with very good combinations of physical properties. The following experiments are provided to illustrate several embodiments of the present invention and do not in any way limit the scope of the claimed invention.

EXPERIMENTS

Styrene Terminated Polycarbonate Using Acetoxy Styrene

Using the following technique and the appropriate amounts of reactants, carbonate oligomers having the indicated weight average molecular weights were prepared in a series of similar reactions as summarized in Table I below.

In the specific case of preparing a carbonate oligomer having a weight average molecular weight of about 5,000, 1,776 grams (g) or 0.011 moles of 4-acetoxystyrene were measured into a vial containing three equivalents (1.85 g, 0.033 moles) of potassium hydroxide as a 25 weight percent solution in water. The 4-acetoxystyrene is commercially available from Hoechst Celanese. This was gently heated with stirring on a hot plate until the contents were homogeneous (one hour at 40° C.).

The hydrolysis products, potassium salts of 4-vinylphenol and acetic acid, were then washed into a five neck 1000 ml round bottom flask equipped with a mechanical stirrer, condenser, phosgene dip tube, caustic addition funnel, and pH probe. The bisphenol A, in an amount of 25.00 g (0.11 moles) was added along with 220 milliliters (ml) methylene chloride and 200 ml water. Triethylamine (2.5 ml, 1.82 grams, 0.018 moles) was added to the mixture followed by 8.80 grams of sodium hydroxide to form the bisphenolate. After about 5 minutes all of the bisphenol A had been converted to the sodium salt and dissolved in the water and phosgene (33 g, 0.33 mole) was added over two hours while maintaining the pH between 10.0 and 11.0 through the slow addition of a 30 weight percent sodium hydroxide solution.

The resulting oligomer solution was washed with 5 percent hydrochloric acid followed by multiple water washes. The oligomer was isolated by flashing off the methylene chloride in rapidly stirred boiling water. The isolated oligomer was filtered and dried in a vacuum oven at 80° C. This polymer is identified as Sample 2 in Table I below. As shown in Tables I and II below, a series of Samples 1 through 9 were prepared according to the above process. In Table I the "Mole % Acetoxystyrene" is the mole percentage of the condensation reactive ethenyl benzene compound employed in the condensation carbonate polymerization process based on the total moles of reactive ethenyl benzene compound and dihydric compound (bisphenol A). This mole percentage is then presumed to be level of the terminal ethenyl benzene moieties in the final product.

Curing (cross-linking) of the polycarbonates prepared as described above was done by compression molding of the oligomer at 160° C. and 10,000 pounds per square inch of pressure followed by heating up to a temperature of 220° C. by constantly increasing the temperature at a rate of 5° C. per minute and holding at that temperature for 30 minutes. The resulting films were found to be insoluble in chloroform.

The presence of the reactive styrene in the carbonate polymer is determined by presence of the vinyl protons by proton NMR analysis. The thermal analysis as shown was performed on a Perkin-Elmer DSC7 differential scanning calorimeter (DSC) or on a DuPont DSC 912 at 10° C./minute to determine glass transition temperatures (Tg) before and after curing. Curing was performed for these samples by heating to at least 200° C. for at least 60 minutes. The maximum in the cure exotherm was observed to at about 200° C. by the DSC. Number average molecular weights were determined by proton NMR using a Varian 400 model 1H NMR to measure the vinyl and isopropylidene methyl protons and calculation of the ratio of the vinyl to the and bisphenol A isopropylidene methyl protons.

The Tg before and after cure are listed in Table 1. The cure temperature was calculated by determination of the maximum in the exothermic peak at approximately 200° C. indicated in the DSC scan. The upper limit for the first heating was taken to 275° C. for most of the samples as it was felt that this temperature would be sufficient to effect complete cure at a heating rate of 10° C./min. The second, post-cure Tg was higher in every case along a straight baseline above Tg. The Tg after cure was basically equivalent to that of linear bisphenol A polycarbonate (slightly lower Tg possibly indicating incomplete cure).

TABLE I

Characterization of Oligomers

| Sample No. | Mole % Acetoxy-styrene | Tg before Cure (°C.) | Tg after Cure (°C.) | Mn (g/mole) |
|---|---|---|---|---|
| 1 | 20 | 103 | 150 | 2600 |
| 2 | 10 | 131 | 147 | 5400 |
| 3 | 6.7 | 140 | 146 | 8500 |
| 4 | 5 | 143 | 149 | 10500 |
| 5 | 10 | 130 | 147 | 7800 |
| 6 | 10 | 131 | 150 | 6700 |

Films were cast from a 15 weight percent chloroform solution for each of the oligomers synthesized. The films from oligomers having molecular weights of less than 6700 g/mole were too brittle to work with. The samples having molecular weights of 6700 g/mole and higher cast films of sufficient quality to thermally cure. The films were cured in a vacuum oven as indicated and produced tough, clear creasable films. The films were insoluble in chloroform and did not show evidence of stress cracking when exposed to acetone. The films prepared from the 6700 molecular weight precursor was observed to be the most chemical or solvent resistant and yielded a film which did not show any ill effects from soaking in acetone for 30 days, remaining creasable and tough after this exposure time to acetone. The films of higher molecular weight were qualitatively observed to be less solvent resistant with the 10,500 molecular weight sample noticeably swelling in chloroform.

Plaques three millimeters in thickness were compression molded at 160° C. The low molecular weight of the oligomers, and corresponding low viscosities, allowed the molding to take place at temperatures only slightly above Tg and sufficiently below the cure temperature. The molding of such thick parts demonstrates the ability to process and mold these materials prior to curing.

In further testing of the adhesive properties of carbonate polymers according to the present invention, samples were evaluated in a Single Lap Shear Test (ASTM D-1002, RT test). The adherends or substrates that were used were aluminum plates (2024 Al alloy) that were 1 inch by 5 inches (25 mm by 127 mm) and 1.5 mm thick. The surfaces to be adhered were treated with a sulfuric acid-dicromate etch (ASTM D-2651-79), FPL etchings, containing 1 part by weight sodium dichromate, 10 parts by weight sulfuric acid, and 30 parts by weight water. Carbonate polymer sample 2 was initially formed into a film by compression molding at 160° C. while samples 8 and 9 were initially formed into a films by compression molding at 190° C. As shown in Table II the film samples were then compression molded between the aluminum plates for the indicated times and at the indicated temperatures to form the laminate structures for evaluation. In the adhesion tests, the adhesive strengths are measured by determining the force required for failure on an Instron and the resulting adhesive strengths given in pounds per square inch (psi).

Table III shows the thicknesses in mils of the adhesive bonding layers resulting from the indicated compression as measured by micrometer. The initial bonding layer thickness was about 13 to 15 mils.

TABLE II

| | | Adhesion Testing | | | | | |
|---|---|---|---|---|---|---|---|
| | | 180° C. Compression | | 200° C. Compression | | 220° C. Compression | |
| Sample No. | Mn | 30 min psi | 60 min psi | 30 min psi | 60 min psi | 30 min psi | 60 min psi |
| 2 | 5400 | — | 3473 | 4111 | 4348 | 4508 | 4428 |
| 8 | 5000 | 3221 | — | — | — | 4353 | — |
| 9 | 2500 | 2983 | — | — | — | — | — |

TABLE III

| | | Bond Layer Thickness | | | | | |
|---|---|---|---|---|---|---|---|
| | | 180° C. Compression | | 200° C. Compression | | 220° C. Compression | |
| Sample No. | Mn | 30 min (mils) | 60 min (mils) | 30 min (mils) | 60 min (mils) | 30 min (mils) | 60 min (mils) |
| 2 | 5400 | — | 5-6 | 5-6 | 3 | 3 | 3 |
| 8 | 5000 | 13 | — | — | — | 13 | — |
| 9 | 2500 | 13 | — | — | — | — | — |

Polycarbonate/Polystyrene Networks

The polycarbonate oligomer Sample 2, prepared as described above and prior to curing, was added to styrene monomer in the varying amounts as shown in the following Table IV. The carbonate polymer was dissolved in styrene monomer with heating in a sealed vial. To this vial was added the indicated amount (0.10 mole percent based on styrene) of azobisisobutyronitrile (AIBN) free radical initiator and the container was heated at 80° C. for 4 hours followed by 150° C. for 1 hour and 200° C. for one hour. The resulting styrene-carbonate copolymers were found to be insoluble in chloroform.

TABLE IV

| Polycarbonate/Polystyrene Networks | | | |
|---|---|---|---|
| Polycarbonate | | | |
| (grams) | (weight percent) | Styrene (grams) | AIBN (milligrams) |
| 0.5 | 10 | 4.5 | 7 |
| 0.75 | 15 | 4.25 | 6.7 |
| 1 | 20 | 4 | 6.3 |

Styrene Terminated Polycarbonate Using 4-Hydroxystyrene

A 3 liter 4-neck round bottom flask equipped with a thermometer, condenser, phosgene/nitrogen inlet, and a paddle stirrer connected to a Cole Parmer servodyne was charged with bisphenol A (158.35 g, 0.694 mole), 4-hydroxystyrene (5.00 g, 0.0416 mole), pyridine (142.7 g, 1.80 mole), and methylene chloride (1.386 liter). The 4-hydroxystyrene which had been prepared according to U.S. Pat. No. 5,087,772, was stored in a freezer prior to use and then quickly weighed and charged to the reactor. The mixture was stirred at 250 rpm and slowly purged with nitrogen as phosgene (72.7 g, 0.735 mole) was bubbled in over 41 minutes while maintaining the reactor temperature at 19°-26° C. During the final stages of phosgene addition, samples of the reaction mixture were added to a solution of 4-(4-nitrobenzyl)-pyridine in tetrahydrofuran (0.1 weight %) to determine the reaction end point. The reaction endpoint was shown colorimetrically when an excess of phosgene was detected indicating substantially complete reaction of all of the hydroxyl groups.

The polymer product was removed from the reaction mixture by adding 5 milliliters (ml) methanol and then a solution of 60 ml of concentrated HCl in 180 ml water. After stirring for 15 minutes at 200 rpm, the mixture was poured into a 4 liter separatory funnel. The methylene chloride layer was separated and washed further with a solution of 15 ml of concentrated HCl in 300 ml water, followed by 300 ml water. The solution was then passed through a column of MSC-1-H ion exchange resin (0.5 liter bed volume) to remove further impurities such as residual pyridine and water.

The product was isolated by adding the clear methylene chloride solution to a mixture of hexane (3.4 liter) and acetone (0.2 liter) in an explosion resistant blender. The product was filtered, dried in a hood overnight, and then dried for approximately 48 hours in a vacuum oven at about 110° C.

The dried product weighed 158.4 g and had an inherent viscosity of 0.296 deciliters per gram (dL/g) determined in methylene chloride at a concentration of 0.5 grams per deciliter (g/dL) at 25° C. The proton NMR spectrum of the product was in agreement with the target ethenyl benzene-terminated polycarbonate composition containing about 0.06 moles of terminal styrene moiety per mole of bisphenol repeat unit in the polycarbonate.

A first DSC analysis was performed scanning from 50° to 350° C. increasing the temperature at a rate of 20° C. per minute. This showed an extrapolated onset Tg of 138° C. prior to curing. The increase in temperature to 350° C. would have resulted in activation and reaction of vinyl groups with each other. The second scan showed a Tg at 150° C. evidencing crosslinking of the polymer.

Compression molded films were prepared from the uncrosslinked product at molding temperatures of 225°, 250°, and 275° C. using a 3 minute molding cycle on a Carver Model C press. The films were clear, colorless, creasable, and did not stress crack when exposed to acetone. These films all had significant amounts of material insoluble in methylene chloride. By comparison, commercial hisphenol A polycarbonate is completely soluble in methylene chloride and is rapidly stress-cracked by acetone.

What is claimed is:

1. A carbonate polymer having ethenyl aryl moieties according to the formula:

$$-Ar-CH=CH_2$$

wherein Ar is an aryl radical optionally substituted with an electron-withdrawing substituent or electron-donating substituent.

2. A carbonate polymer according to claim 1 having terminal ethenyl aryl moieties.

3. A carbonate polymer according to claim 1 having an average of from about 1 to about 100 recurring units according to the formula:

$$\left[ \{(A)(-)_v\}_v O - \overset{O}{\underset{\|}{C}} - O \right]$$

where A is a radical having at least 2 valences which is a remnant of a multi-hydric compound, (—) represents valences of A connecting to a carbonate moiety and v is the number of valences of A in excess of 1, an integer greater than or equal to 1.

4. A carbonate polymer according to claim 1 comprising a multi-hydric compound remnant polymerized therein and at least about 0.01 mole of ethenyl aryl moieties per mole of multi-hydric compound remnant.

5. A carbonate polymer according to claim 4 comprising from about 0.1 to about 2 mole of ethenyl aryl moieties per mole of multi-hydric compound.

6. A carbonate polymer according to claim 5 comprising from about 0.1 to about 1 mole of ethenyl aryl moieties per mole of multi-hydric compound.

7. A carbonate polymer according to claim 1 wherein an ethenyl aryl chain terminating compound and additional chain terminating agent(s) are reacted in the polymer.

8. A carbonate polymer according to claim 7 wherein at least 0.01 mole of an ethenyl aryl chain terminating compound is reacted per mole of additional chain terminating agent(s).

9. A carbonate polymer according to claim 7 wherein up to about 0.5 moles ethenyl aryl chain terminating compound is reacted per mole of additional chain terminating agent(s).

10. A carbonate polymer according to claim 7 wherein from about 0.1 to about 0.5 mole ethenyl aryl chain terminating compound is reacted per mole of additional chain terminating agent.

11. A carbonate polymer according to claim 1 wherein the ethenyl aryl moiety is styryl.

12. A process for the preparation of a carbonate polymer based on one or more multi-hydric compounds which carbonate polymer has one or more ethenyl aryl moieties according to the formula:

$$-Ar-CH=CH_2$$

wherein Ar is an aryl radical optionally substituted with an electron-withdrawing substituent or electron-donating substituent, the process comprising the step of adding to a reaction mixture in a condensation carbonate polymerization process one or more condensation reactive compounds which contains ethenyl aryl moieties.

13. A condensation carbonate polymerization process comprising the steps of:
   a. supplying to a reaction vessel a reaction mixture comprising (i) a multi-hydric compound; (ii) a carbonate polymer precursor; and (iii) from about 0.01 to about 1 mole of condensation reactive compound which contains ethenyl aryl moieties per mole of multi-hydric compound, which ethenyl aryl moieties correspond to the formula:

$$-Ar-CH=CH_2$$

wherein Ar is an aryl radical optionally substituted with an electron-withdrawing substituent or electron-donating substituent; (i), (ii) or (iii) being supplied independently or in combinations of two or more;
   b. maintaining the reaction mixture under condensation carbonate polymerization conditions; and
   c. recovering from the reaction mixture a carbonate polymer having ethenyl aryl moieties.

14. A process according to claim 12 wherein the condensation reactive compound is acetoxy styrene.

15. A process according to claim 12 wherein the condensation reactive compound is hydroxy styrene.

16. A process according to claim 12 wherein the condensation reactive compound is vinyl benzyl chloride.

17. A process according to claim 13 comprising the step of subjecting the condensation polymer product having ethenyl aryl moieties to conditions under which the ethenyl aryl moieties react to crosslink or branch the polymer.

* * * * *